(12) United States Patent
James

(10) Patent No.: US 6,746,525 B1
(45) Date of Patent: Jun. 8, 2004

(54) DISAZO DYES AND INKS CONTAINING THEM

(75) Inventor: Mark Robert James, Manchester (GB)

(73) Assignee: Avecia Limited, Manchester (GB)

( * ) Notice: Subject to any disclaimer, the term of this patent is extended or adjusted under 35 U.S.C. 154(b) by 117 days.

(21) Appl. No.: 10/088,307

(22) PCT Filed: Aug. 14, 2000

(86) PCT No.: PCT/GB00/03113
§ 371 (c)(1),
(2), (4) Date: Mar. 18, 2002

(87) PCT Pub. No.: WO01/19925
PCT Pub. Date: Mar. 22, 2001

(30) Foreign Application Priority Data

Sep. 16, 1999 (GB) ............................................... 9921928

(51) Int. Cl.$^7$ .......................... C09D 11/02; C09B 31/02; B32B 27/14
(52) U.S. Cl. .................... 106/31.52; 534/826; 534/823; 8/687; 8/696; 428/195.1
(58) Field of Search ........................ 106/31.52; 534/829, 534/823; 8/687, 696; 428/195.1

(56) References Cited

U.S. PATENT DOCUMENTS

| | | | | |
|---|---|---|---|---|
| 3,102,109 A | * | 8/1963 | Steinemann | ................ 534/701 |
| 4,056,523 A | * | 11/1977 | Mischke | ...................... 534/847 |
| 4,247,460 A | * | 1/1981 | Hugl et al. | .................. 534/829 |
| 4,318,849 A | * | 3/1982 | Buhler et al. | ................ 534/695 |
| 4,367,172 A | * | 1/1983 | Pedrazzi | ...................... 534/797 |
| 4,466,920 A | * | 8/1984 | Uehlinger | .................... 534/829 |
| 4,626,284 A |  | 12/1986 | Ohta et al. | ................ 106/31.52 |
| 4,956,457 A |  | 9/1990 | Takayanagi | .................. 534/643 |
| 5,175,260 A | * | 12/1992 | Schroeder et al. | ........... 534/604 |
| 5,198,022 A |  | 3/1993 | Aulick et al. | ............. 106/31.52 |
| 5,420,258 A | * | 5/1995 | Schaetzer et al. | ............ 534/644 |
| 5,969,114 A | * | 10/1999 | Wight et al. | ................. 534/642 |
| 6,288,217 B1 | * | 9/2001 | Beach et al. | ................. 534/728 |
| 6,451,989 B1 | * | 9/2002 | Beach et al. | ................. 534/728 |
| 6,559,292 B1 | * | 5/2003 | Mistry et al. | ................ 534/829 |

FOREIGN PATENT DOCUMENTS

FR  2367856  5/1978

OTHER PUBLICATIONS

Derwent abstract of FR 2367856, Jun. 1978.*

* cited by examiner

Primary Examiner—Helene Klemanski
(74) Attorney, Agent, or Firm—Pillsbury Winthrop LLP

(57) ABSTRACT

A compound comprising a disazo chromaphore and an optionally substituted acyl group linked together through a —SO$_2$—NH— group, inks comprising these compounds, ink jet printer cartridges containing these inks and their use in ink jet printing.

19 Claims, No Drawings

DISAZO DYES AND INKS CONTAINING THEM

CROSS REFERENCE TO RELATED APPLICATIONS

This application is a national phase application based on PCT/GB00/03113, filed Aug. 14, 2000, and which further claims priority from British Application No. 9921928.9 filed Sep. 16, 1999. These applications in their entirety are incorporated herein by reference.

This invention relates to compounds, to inks comprising these compounds, to ink jet printer cartridges containing these inks and to their use in ink jet printing ("IJP").

IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

According to the present invention there is provided a compound comprising a disazo chromophore and an optionally substituted acyl group linked together through a —SO$_2$NH— group.

Preferably where, the nitrogen atom of the —SO$_2$NH— group is attached to the acyl group through a single covalent bond. It is especially preferred that the compound is of Formula (1) and salts thereof:

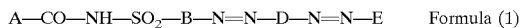

A—CO—NH—SO$_2$—B—N=N—D—N=N—E   Formula (1)

wherein:
- A is an optionally substituted alkyl or aryl group;
- B and D are each independently optionally substituted phenylene or naphthylene; and
- E is optionally substituted naphthylene.

A is preferably an optionally substituted alkyl or aryl group it is especially preferred that A is optionally substituted C$_{1-4}$-alkyl or optionally substituted phenyl. Preferred optional substituents are selected from; alkoxy, more preferably C$_{1-4}$-alkoxy; polyalkylene oxide; nitro; cyano; amino; sulpho; halo, especially bromo, chloro or fluoro; ureido; PO$_4$H$_2$ SO$_2$F; hydroxy; carboxy; ester, more preferably —CO$_2$(C$_{1-4}$-alkyl); and —NR$^1$R$^2$—COR$^1$, —CONR$^1$R$^2$ and —SO$_2$NR$^1$R$^2$ wherein R$^1$ and R$^2$ are each independently H or alkyl, preferably H or C$_{1-4}$-alkyl Preferably B is optionally substituted phenylene, more preferably optionally substituted 1,4-phenylene Preferred optional substituents which may be present on B, D or E are selected from alkyl more preferably C$_{1-4}$-alkyl; alkoxy, more preferably C$_{1-4}$-alkoxy; polyalkylene oxide; nitro; cyano; amino; sulpho; halo, especially bromo, chloro or fluoro; ureido; PO$_4$H$_2$; SO$_2$F; hydroxy; carboxy; ester, more preferably —CO$_2$(C$_{1-4}$-alkyl); and —NR$^1$R$^2$COR$^1$, —CONR$^1$R$^2$ and —SO$_2$NR$^1$R$^2$ wherein R$^1$ and R$^2$ are each independently H or alkyl, preferably H or C$_{1-4}$-alkyl.

Preferably D is an optionally substituted 1,4-phenylene group, more preferably D is of the formula:

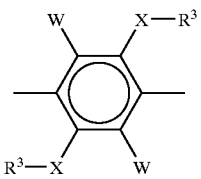

wherein each:
- W independently is H, optionally substituted alkyl, optionally substituted alkoxy, polyalkylene oxide, nitro, cyano, sulpho, halo, ureido, SO$_2$F, PO$_4$H$_2$, hydroxy, carboxy, ester, —NR$^1$R$^2$, —COR$^1$, —CONR$^1$R$^2$ or —SO$_2$NR$^1$R$^2$;
- X independently is O, NH or S;
- R$^1$ and R$^2$ are each independently H or alkyl, preferably H or C$_{1-4}$-alkyl; and
- R$^3$ independently is H, optionally substituted alkyl or optionally substituted aryl.

Preferably each W independently is H, C$_{1-4}$-alkyl or C$_{1-4}$-alkoxy more preferably H, methyl, ethyl, methoxy or ethoxy, especially H. Preferably both groups represented by W are H and X is O.

Preferably each R$^3$ independently is optionally substituted C$_{1-4}$-alkyl or optionally substituted phenyl more preferably C$_{1-4}$-alkyl or C$_{1-4}$-alkyl-OH; phenyl or phenyl carrying one or two substituents selected from carboxy and sulpho.

When D is also optionally substituted naphthylene it preferably carries one or more (preferably 1 to 4) substituents selected from hydroxy, amino, sulpho and carboxy.

Preferably E is optionally substituted naphthylene, more preferably carrying one or more (preferably from 1 to 4) groups selected from hydroxy, amino, sulpho and carboxy. More preferably E is naphthylene carrying one hydroxy group, one amino group and 0, 1 or 2 sulpho groups. It is especially preferred that E is a 1-hydroxy-3-sulphonaphth-2-ylene group carrying an optionally substituted amino group at the 7-position; or a 1-hydroxy-5-sulphonaphth-2-ylene group carrying an optionally substituted amino group at the 8-position; or a 1-hydroxy-3,6-disulphonaphth-2-ylene group carrying an optionally substituted amino group at the 8-position or a 1-hydroxy-3,6-disulphonaphth-2-ylene group carrying an optionally substituted amino group at the 7-position.

Preferred optionally substituted amino groups are of the formula —NR$^4$R$^5$ where R$^4$ and R$^5$ are independently selected from H, optionally substituted alkyl and optionally substituted phenyl. Preferably R$^4$ and R$^5$ are both H.

The compounds described hereinbefore are preferably soluble in water. To achieve this solubility, the compounds preferably have 1, 2 or 3 water-dispersing substituents. Preferred water-dispersing substituents are polyalkylene oxides and more preferably sulpho and carboxy.

Preferred polyalkylene oxide groups which may be present on A, B, D and/or E are poly(C$_{2-3}$-alkylene oxide) groups, more preferably polyethylene glycol or polypropylene glycol, preferably having from 1 to 20 glycol units and terminated with a hydroxy or C$_{1-4}$-alkoxy group.

Preferably A, B, D and E are selected from the definitions given above such that the pKa of the linking —NH— group (e.g as shown in FIG. 1)is from 8 to 3, more preferably 7.5 to 4, especially 7 to 4.5. These preferences arise from the finding that compounds having such an —NH— group have a particularly good combination of water-fastness and optical density when printed on paper.

Any acid or basic groups on the compound, particularly carboxylic acid and sulphonic acid groups, are preferably in the form of a salt. Thus the Formulae shown herein include the compounds in free acid and in salt form.

The compounds of the invention may be prepared by condensing a diazo chromophore and an optionally substituted acyl compound, where one has a sulphonyl halide substituent and the other has an amino substituent. This condensation is preferably performed in the presence of base to absorb hydrogen halide as it is generated during the condensation.

The compound of Formula A—CO—NH—SO$_2$—B—N=N—D—N=N—E may be prepared by diazotising an amine of the formula A—CO—NH—SO$_2$—B—N=N—D—NH$_2$ and coupling the resultant diazonium salt with a compound of the formula H—E.

The compound of Formula A—CO—NH—SO$_2$—B—N=N—D—NH$_2$ may be prepared by diazotising an amine of the formula A—CO—NH—SO$_2$—B—NH$_2$ and coupling the resultant diazonium salt with an amine of the formula H—D—NH$_2$. In some cases it may be necessary for the amino group to carry a protecting group which should be removed on completion of the reaction.

Many compounds of the formula A—CO—NH—SO$_2$—B—NH$_2$ are commercially available.

Preferably they may be prepared by condensing an amine of formula B—(NH$_2$)$_2$, in which one of the amino groups is protected, with a compound of formula Cl—SO$_2$—NH—CO— A followed by removal of the protecting group.

More preferably they may be prepared by condensing an amine of formula A—CO—NH$_2$ with a compound of formula Cl—SO$_2$—B—NH$_2$ carrying a protecting group on the amino group of the Cl—SO$_2$—B—NH$_2$ compound, followed by removal of the protecting group.

Diazotisation is preferably performed at a temperature below 6° C., more preferably at a temperature in the range −10° C. to 5° C. Preferably diazotisation is performed in water, preferably at a pH below 7 for the monoazo intermediate and above pH7 to form compounds of Formula (1). Dilute mineral acid, e.g. HCl or H$_2$SO$_4$, may be used to achieve the desired acidic conditions.

In the above processes, A, B, D and E are as hereinbefore defined.

Any acid or basic groups on the compound, particularly carboxylic acid and sulphonic acid groups, are preferably in the form of a salt. Thus the Formulae shown herein include the compounds in free acid and in salt form.

Preferred salts are alkali metal salts, especially lithium, sodium and potassium salts, ammonium and substituted ammonium salts. Especially preferred salts are salts with ammonia and volatile amines. The compounds may be converted into a salt using known techniques. For example, an alkali metal salt of a compound may be converted into a salt with ammonia or an amine by dissolving an alkali metal salt of the compound in water, acidifying with a mineral acid and adjusting the pH of the solution to pH 9 to 9.5 with ammonia or the amine and removing the alkali metal cations by dialysis or by treatment with an ion exchange resin.

The compounds may exist in tautomeric forms other than those shown in this specification. These tautomers are included within the scope of the present claims. The compounds are particularly useful as dyes, especially for ink jet printing compositions.

According to a second aspect of the present invention there is provided a composition comprising a compound according to the first aspect of the invention, preferably of Formula (1) and a liquid medium.

Preferred compositions comprise:
(a) from 0.01 to 30 parts of a compound according to the first aspect of the invention, preferably of Formula (1): and
(b) from 70 to 99.99 parts of a liquid medium;

wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

Preferably component (a) is completely dissolved in component (b). Preferably component (a) has a solubility in component (b) at 20° C. of at least 10%. This allows the preparation of liquid dye concentrates which may be used to prepare more dilute inks and reduces the chance of the dye precipitating if evaporation of the liquid medium occurs during storage.

Preferred liquid media include water, a mixture of water and an organic solvent and an organic solvent free from water.

When the medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include C$_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketonealochols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglyols, preferably diethylene glycol, triethylene glycol, polyethylene glycol and polypropylene glycol; triols, preferably glycerol and 1,2,6hexanetriol; mono-C$_{1-4}$-alkyl ethers of diols, preferably mono-C$_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethy-pyrrolidone; diols, especially 1,5-pentane diol, ethyleneglycol, thiodiglycol, diethyleneglycol and triethyleneglycol; and mono- C$_{1-4}$-alkyl and C$_{1-4}$-alkyl ethers of diols, more preferably mono- C$_{1-4}$-alkyl ethers of diols having 2 to 12 carbon atoms, especially 2-methoxy-2-ethoxy-2-ethoxyethanol.

Although not usually necessary, further colorants may be added to the ink to modify the shade and performance properties. Examples of such colorants include C.I.Direct Yellow 86, 132, 142 and 173; C.I.Direct Blue 199, and 307; C.I.Food Black 2; C.I.Direct Black 168 and 195; C.I.Acid Yellow 23; and any of the dyes used in ink jet printers sold by Seiko Epson Corporation, Hewlett Packard Company, Canon Inc. & Lexmark International. Addition of such further dyes can increase overall solubility leading to less kogation (nozzle blockage) for the resultant ink.

Examples of further suitable liquid media comprising a mixture of water and one or more organic solvents are described in U.S. Pat. No. 4,963,189, U.S. Pat. No. 4,703,113, U.S. Pat. No. 4,626,284 and EP 4,251,50A.

When the liquid medium comprises an organic solvent free from water, (i.e. less than 1% water by weight) the solvent preferably has a boiling point of from 300 to 200° C. more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the compound in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Liquid media comprising an organic solvent free from water are particularly useful where fast drying times are required and particularly when printing onto hydrophobic and non-absorbent substrates, for example plastics, metal and glass.

The liquid media may also contain additional components conventionally used in ink jet printing inks, for example viscosity and surface tension modifiers, corrosion inhibitors, biocides, kogation reducing additives and surfactants which may be ionic or non-ionic.

It is preferred that a composition according to the second aspect of the invention is an ink or liquid dye concentrate.

A third aspect of the invention provides a process for forming an image on a substrate comprising applying an ink according to the second aspect of the invention thereto by means of an ink jet printer.

The ink used in this process is preferably a composition as defined in the second aspect of the present invention.

The inks preferably have a total concentration of divalent metal ions and trivalent metal ions below 1000 more preferably below 100, especially below 20, more especially below 10 parts per million by weight relative to the total weight of ink. Pure inks of this type may be prepared by using high purity ingredients and/or by purifying the ink after it has been prepared. Suitable purification techniques are well known, e.g. ultrafiltration, reverse osmosis, ion exchange and combinations thereof.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character.

A fourth aspect of the present invention provides a paper, an overhead projector slide or a textile material printed with a composition according to the second aspect of the invention, a compound according to the first aspect of the invention or by means of a process according to third aspect of the invention.

A fifth aspect of the present invention provides an ink jet printer cartridge comprising a chamber and an ink wherein the ink is in the chamber and the ink is according to the second aspect of the present invention.

A final aspect of the invention is a method for the colouration of a substrate which comprises treating with a compound according to the first aspect of this inventon.

The invention is further illustrated by the following Examples in which all parts and percentages are by weight unless otherwise stated.

EXAMPLE 1

Preparation of:

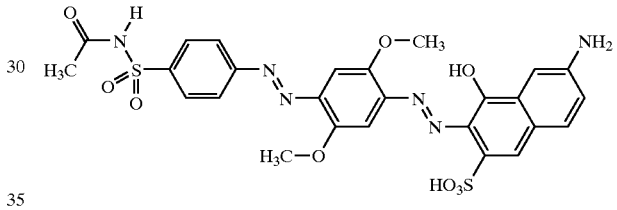

Sulfacetamide (16.8 parts) was dissolved in distilled water (550 parts) by the addition of the minimum amount of 47% caustic liquor with stirring. Sodium nitrite (5.68 parts) was then added and the solution was cooled to 0° C. This mixture was poured into pre-cooled (0° C.) concentrated hydrochloric acid (75 parts) with vigorous stirring. The mixture was stirred at 0–5° C. for 4 hours, then enough sulfamic acid was added to destroy the excess nitrous acid present and the mixture was stirred for a further 15 minutes. This mixture was then added to a stirred mixture of 2,5dimethoxyaniline (12.6 parts) and methylated sprits (74OP, 400 parts) over approximately 15 minutes with the co-addition of enough ice and saturated sodium acetate solution to maintain the temperature at 0–5° C. and the pH in the range of 4–5. The mixture was then stirred at 0–5° C. for 1 hour, allowed to warm to room temperature and stirred over night at room temperature. The product was filtered, washed twice with distilled water and dried at approximately 70° C. overnight to yield, 28.5 parts of product at 91% strength by C, H and N analysis.

The monoazo intermediate (3 parts) and sodium nitrite (0.52 parts) was stirred in distilled water (100 parts) at 0° C. Concentrated hydrochloric acid (7.5 parts) was added with vigorous stirring and the mixture was stirred at 0–5° C. for 2 hours. Tetrahydrofuran (150 parts) was added and the mixture was stirred at 0–5° C. for a further 3 hours. Sulfamic acid was added to destroy the excess nitrous acid present and the mixture was stirred for a further 15 minutes. This mixture was then added to a stirred solution of gamma acid (1.9 parts) and sodium carbonate (to pH 10–11) in water (100 parts), over approximately 30 minutes with the co-addition of enough ice and 47% caustic liquor solution to maintain the temperature at 0–5° C. and the pH in the range of 9.5–10. The mixture was stirred at 0–5° C. for 1 hour, allowed to warm to room temperature and stirred overnight at room temperature. The mixture was acidified to pH 3 by the slow addition of concentrated hydrochloric acid, the product was filtered, washed with dilute hydrochloric acid and triturated twice with acetone (170 parts) containing 880 ammonia (3 drops).

The crude sodium salt was then exchanged for the ammonium salt by dissolving the compound in aqueous ammonia at approximately pH 10–11 and slowly pouring this solution into an equal volume of vigorously stirred 2N hydrochloric acid. The precipitated compound was filtered and the ion exchange process repeated.

The crude ammonium salt was dissolved in dilute aqueous ammonia at approximately pH 10–11, filtered through a GF-A and GF-F glass fibre filter and dialysed using 'Visking tubing'. This solution was dried at approximately 70° C. overnight to yield 1.8 parts of product which shown to have the correct structure by nmr and mass spectral analysis.

Inks were then prepared by dissolving the specified % of the compound in a stock solution of 9 parts water and 1 part 1-methyl-2-pyrrolidinone with the addition of concentrated ammonia to give a pH of 9–10. The inks were then filtered through a 0.45 micron membrane filter and printed using HP 560 thermal IJ printer. The following results were obtained on Wiggins Conquer paper:

| % Dye in ink | OD | Run down (24 h) |
|---|---|---|
| 2.5 | 1.446 | 4 |

*OD means optional density of the printed paper, as measured by an x-rite spectrometer.

Rundown was measured by printing the ink in parallel bands onto the paper, allowing the printed paper to dry for 24 hours, placing the printed paper at an angle of 45° and pouring 0.25 ml of water down the paper. The run down (a measure of wet-fastness) was given a score of 1 to 10, where 10 means no visible ink run (high wet-fastness).

EXAMPLE 2

Preparation of:

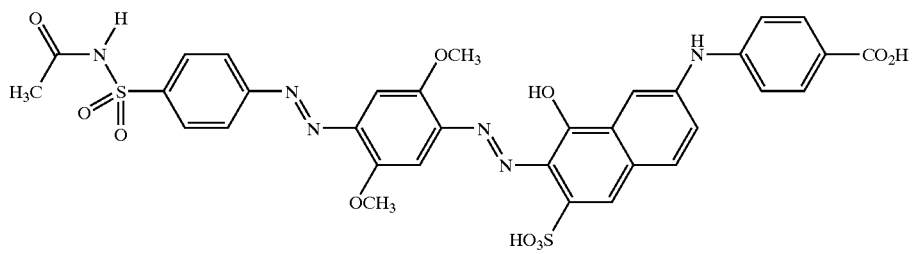

Example 1 was repeated except that p-carboxyphenyl gamma acid was used in place of gamma acid in the final coupling reaction.

Inks containing the title dye were prepared and printed onto Gilbert Bond paper (as $NH_4^+$ salt) as described in Example 1.

The following results were obtained:

| % Dye in ink | OD | Run down (24 h) |
|---|---|---|
| 2.5 | 1.113 | 9 |

EXAMPLE 3

Preparation of:

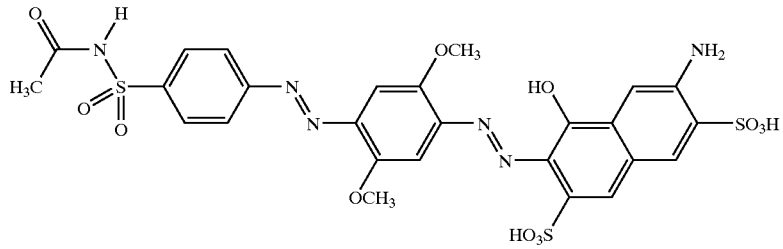

Example 1 was repeated except that 2-R acid was used in place of gamma acid in the final coupling reaction.

Inks containing the title dye were prepared as in Example 1 except a mixture of glycerol (10%), butyldiglycol (10%), and surfynol 465 (1%) was used in place of N-methyl-2-pyrolidone and the resultant ink was printed onto Xerox Acid (as NH4+ salt) paper using a Epson Color 660 printer.

The following results were obtained:

| % Dye in ink | OD |
|---|---|
| 6% | 1.299 |

EXAMPLE 4

Preparation of:

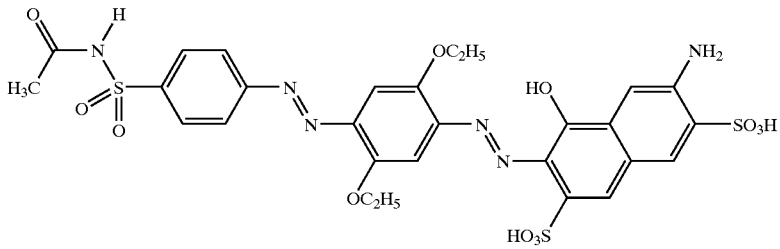

Example 1 was repeated except that 2,5-diethoxyaniline was used in place of that 2,5dimethoxyaniline in the first coupling reaction and 2-R acid was used in place of gamma acid in the final coupling.

Inks containing the title dye were prepared as in Example 1 except a mixture of glycerol (7.5%), thiodiglycol (7.5%), urea (7.5%) and surfynol 465 (1%) was used in place of N-methyl-2-pyrolidone and the resultant ink was printed onto Xerox Acid (as NH4+ salt) paper using a Canon BJC-2000 printer.

The following results were obtained:

| % Dye in ink | OD | Run down (24 h) |
|---|---|---|
| 3.5 | 1.075 | 8.5 |

EXAMPLE 5

Preparation of:

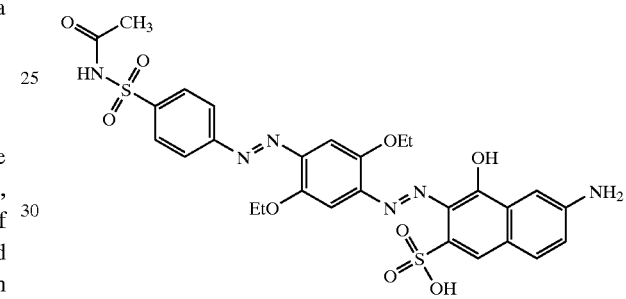

Example 1 was repeated except 2,5-diethoxyaniline was used in place of 2,5-dimethoxyaniline in the first coupling reaction.

Inks containing the title dye were prepared and printed onto Xerox Acid paper as described in Example 1.

The following results were obtained:

| % Dye in ink | OD | Run down (24 h) |
|---|---|---|
| 2.5% | 1.01 | 7 |

EXAMPLE 6

Preparation of:

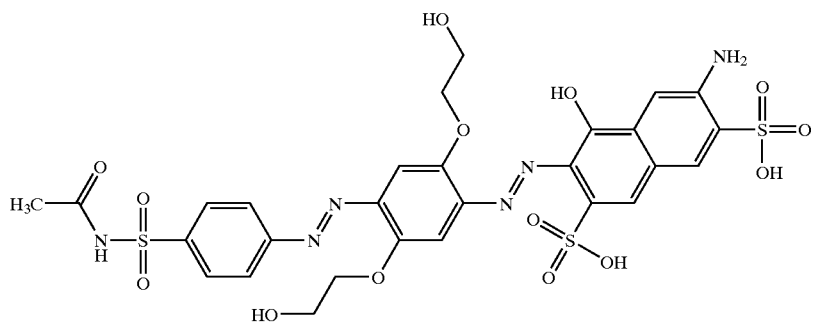

Example 1 was repeated except 2,5-di(2-hydroxyethoxy) aniline replaced 2,5-dimethoxyaniline in the first coupling reaction and 2-R acid was used in place of gamma acid in the final coupling.

Inks containing the title dye were prepared as described in Example 5 of PCT/GB00/2280 and printed onto Xerox Acid (as Na+ salt) paper as described in Example 1.

The following results were obtained:

| % Dye in ink | OD | Run down (24 h) |
|---|---|---|
| 3 | 1.07 | 7.5 |

EXAMPLE 7

Preparation of:

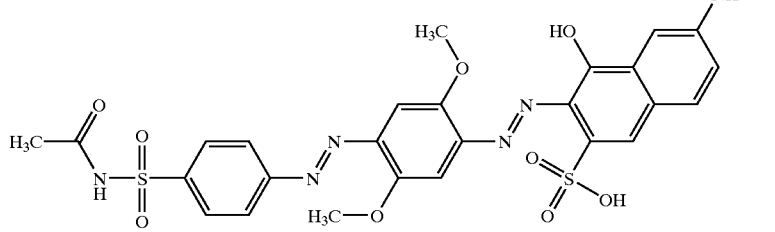

Example 1 was repeated except tetrahydrofurfuryl gamma acid was used in place of gamma acid in the final coupling. Tetrahydrofurfuryl gamma acid was prepared as described in Example 1, stage 2 of WO 9732931 except that tetrahydrofurfurylamine replaced (2-aminoethyl)piperazine.

Inks containing the title dye were prepared as described in Example 5 of PCT/GB00/02280 and printed onto Xerox Acid (as Na+ salt) paper as described in Example 1.

The following results were obtained:

| % Dye in ink | OD | Run down (24 h) |
|---|---|---|
| 3 | 1.08 | 8 |

Further Inks

The inks described in Tables I and II may be prepared wherein the Dye described in the first column is the Dye made in the above example of the same number. Numbers quoted in the second column onwards refer to the number of parts of the relevant ingredient and all parts are by weight. The inks may be applied to paper by thermal or piezo ink jet printing.

The following abbreviations are used In Table I and II:

PG=propylene glycol
DEG=diethylene glycol
NMP=N-methyl pyrollidone
DMK=dimethylketone
IPA=isopropanol:
MEOH=methanol
2P=2-pyrollidone
MIBK=methylisobutyl ketone
P12=propane-1,2-diol
BDL=butane-2,3-diol
CET=cetyl ammonium bromide
PHO=Na$_2$HPO$_4$ and
TBT=tertiary butanol
TDG=thiodiglycol

TABLE I

| Example | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 |   | 6 | 4 |   |   |   |   | 5 |   |
| 2 | 3.0 | 90 |   | 5 | 5 |   | 0.2 |   |   |   |   |   |
| 3 | 10.0 | 85 | 3 |   | 3 | 3 |   |   |   | 5 | 1 |   |
| 4 | 2.1 | 91 |   | 8 |   |   |   |   |   |   |   | 1 |
| 5 | 3.1 | 86 | 5 |   |   |   |   | 0.2 | 4 |   |   | 5 |
| 6 | 1.1 | 81 |   |   | 9 |   | 0.5 | 0.5 |   |   | 9 |   |
| 7 | 2.5 | 60 | 4 | 15 | 3 | 3 |   |   | 6 | 10 | 5 | 4 |
| 1 | 5 | 65 |   | 20 |   |   |   |   | 10 |   |   |   |
| 3 | 2.4 | 75 | 5 | 4 |   | 5 |   |   |   | 6 |   | 5 |
| 4 | 4.1 | 80 | 3 | 5 | 2 | 10 |   | 0.3 |   |   |   |   |
| 1 | 3.2 | 65 |   | 5 | 4 | 6 |   |   | 5 | 4 | 6 | 5 |
| 6 | 5.1 | 96 |   |   |   |   |   |   |   | 4 |   |   |
| 2 | 10.8 | 90 | 5 |   |   |   |   |   | 5 |   |   |   |
| 5 | 10.0 | 80 | 2 | 6 | 2 | 5 |   |   | 1 |   | 4 |   |
| 1 | 1.8 | 80 |   | 5 |   |   |   |   |   |   | 15 |   |

TABLE I-continued

| Example | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.6 | 84 | | | 11 | | | | | | 5 | |
| 1 | 3.3 | 80 | 2 | | | 10 | | | | 2 | | 6 |
| 1 | 12.0 | 90 | | | | 7 | 0.3 | | 3 | | | |
| 1 | 5.4 | 69 | 2 | 20 | 2 | 1 | | | | | 3 | 3 |
| 1 | 6.0 | 91 | | | 4 | | | | | | 5 | |

TABLE II

| Example | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 | | | 0.2 | | | | | 5 | |
| 2 | 9.0 | 90 | | 5 | | | | | | 1.2 | | 5 |
| 3 | 1.5 | 85 | 5 | 5 | | 0.15 | 5.0 | 0.2 | | | | |
| 4 | 2.5 | 90 | | 6 | 4 | | | | | 0.12 | | |
| 5 | 3.1 | 82 | 4 | 8 | | 0.3 | | | | | | 6 |
| 6 | 0.9 | 85 | | 10 | | | | | 5 | 0.2 | | |
| 7 | 8.0 | 90 | | 5 | 5 | | 0.3 | | | | | |
| 1 | 4.0 | 70 | | 10 | 4 | | | | 1 | | 4 | 11 |
| 2 | 2.2 | 75 | 4 | 10 | 3 | | | | 2 | | 6 | |
| 3 | 10.0 | 91 | | | 6 | | | | | | 3 | |
| 4 | 9.0 | 76 | | 9 | 7 | | 3.0 | | | 0.95 | 5 | |
| 5 | 5.0 | 78 | 5 | 11 | | | | | | | 6 | |
| 7 | 5.4 | 86 | | | 7 | | | | | | 7 | |
| 1 | 2.1 | 70 | 5 | 5 | 5 | 0.1 | 0.2 | 0.1 | 5 | 0.1 | 5 | |
| 1 | 2.0 | 90 | | 10 | | | | | | | | |
| 1 | 2 | 88 | | | | | | 10 | | | | |
| 1 | 5 | 78 | | | 5 | | | 12 | | | 5 | |
| 6 | 8 | 70 | 2 | | 8 | | | 15 | | | 5 | |
| 1 | 10 | 80 | | | | | | 8 | | 12 | | |
| 1 | 10 | 80 | | 10 | | | | | | | | |

What is claimed is:

1. A compound of Formula (1) or salt thereof, comprising a disazo chromophore and an optionally substituted acyl group linked together through a —SO$_2$—NH— group:

A—CO—NH—SO$_2$—B—N=N—D—N=N—E      Formula (1)

wherein:

A is an optionally substituted alkyl or aryl group;

B and D are each independently optionally substituted phenylene or naphthylene; and E is optionally substituted naphthylene.

2. A compound according to claim 1 wherein A is optionally substituted C$_{1-4}$-alkyl or optionally substituted phenyl.

3. A compound according to claim 1 wherein B is optionally substituted phenylene.

4. A compound according to claim 1 wherein B is optionally substituted 1,4-phenylene.

5. A compound according to claim 1 wherein D is optionally substituted 1,4-phenylene.

6. A compound according to claim 1 wherein D is of the formula:

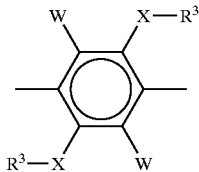

wherein each:

W independently is H, C$_{1-4}$-alkyl, alkoxy, polyalkylene oxide, nitro, cyano, amino, sulpho, halo, ureido, SO$_2$F, PO$_4$H$_2$, hydroxy, carboxy, ester, —NR$^1$R$^2$, —COR$^1$, —CON$^1$R$^2$ or —SO$_2$NR$^1$R$^2$, wherein R$^1$ and R$^2$ are each independently H or alkyl;

X independently is O, NH or S;

R$^3$ independently is H or optionally substituted alkyl or optionally substituted aryl.

7. A compound according to claim 1 wherein D is naphthylene carrying one or more groups selected from the group consisting of hydroxy, amino, sulpho and carboxy.

8. A compound according to claim 1 wherein E is naphthylene carrying one or more substituents selected from the group consisting of hydroxy, amino, sulpho and carboxy.

9. A compound according to claim 1 wherein E is a 1-hydroxy-3-sulphonaphth-2-ylene group carrying an optionally substituted amino group at the 7-position; or a 1-hydroxy-5-sulphonaphth-2-ylene group carrying an optionally substituted amino group at the 8-position; or a 1-hydroxy-3,6-disulphonaphth-2-ylene group carrying an optionally substituted amino group at the 8-position or a 1-hydroxy-3,6-disulphonaphth-2-ylene group carrying an optionally substituted amino group at the 7-position.

10. A compound according to claim 1 wherein the pKa of the —NH— group is from 8 to 3.

11. A composition comprising a compound according to claim 1 and a liquid medium.

12. A composition according to claim 11 which is an ink or liquid dye concentrate.

13. A process for forming an image on a substrate comprising applying an ink according to claim 12 thereto by means of an ink jet printer.

14. A paper, an overhead projector slide or a textile material printed with an ink according to claim 12.

15. An ink jet printer cartridge comprising a chamber and an ink wherein the ink is in the chamber and the ink is according to claim 12.

16. A method for the colouration of a substrate which comprises treating the substrate with a compound according to claim 1.

17. A paper, an overhead projector slide or a textile material printed with an ink comprising a compound according to claim 1.

18. A paper, an overhead projector slide or a textile material printed by means of a process according to claim 13.

19. A compound according to claim 1 wherein:

A is optionally substituted $C_{1-4}$-alkyl or optionally substituted phenyl;

B is optionally substituted phenylene;

D is optionally substituted 1,4-phenylene or naphthylene; and

E is naphthylene carrying one or more substituents selected from the group consisting of hydroxy, amino, sulpho and carboxy.

\* \* \* \* \*